United States Patent [19]

Dietrich et al.

[11] Patent Number: 4,937,022

[45] Date of Patent: Jun. 26, 1990

[54] PROCESS FOR THE CONTINUOUS COOLING AND SOLIDIFICATION OF METAL OXIDES BY CONTINUOUS CASTING

[75] Inventors: Rainer Dietrich, Basel, Switzerland; Norbert Burkhardt, Karlsruhe; Peter Kuhn, Weinheim, both of Fed. Rep. of Germany

[73] Assignee: Lonza Ltd., Gampel, Switzerland

[21] Appl. No.: 165,308

[22] Filed: Mar. 8, 1988

[30] Foreign Application Priority Data

Mar. 11, 1987 [DE] Fed. Rep. of Germany ....... 3707870

[51] Int. Cl.$^5$ ............................................. C04B 33/02
[52] U.S. Cl. .................. 264/40.7; 264/40.5; 264/175
[58] Field of Search ..................... 264/40.7, 40.5, 175; 425/141

[56] References Cited

U.S. PATENT DOCUMENTS

| | | | |
|---|---|---|---|
| 1,989,038 | 1/1935 | Brown | 425/141 |
| 3,543,333 | 12/1970 | Anders et al. | 425/141 |
| 3,686,376 | 8/1972 | Ayers | 264/40.7 |

FOREIGN PATENT DOCUMENTS 0057651 9/1986 European Pat. Off. .
1259762 2/1968 Fed. Rep. of Germany .

*Primary Examiner*—James Derrington
*Attorney, Agent, or Firm*—Fisher, Christen & Sabol

[57] ABSTRACT

To obtain from a product melt a product strip of uniform gage in the nip between two rotating rolls in a continuous cooling and solidifying of metal oxides by cotinuous casting, the gage of the nip, which is preset by the respective product strip, is measured between the rolls. One of the rolls is prestressed against the other by a force. The deviation of the measured gage from a set value is determined and the roll speed is regulated by means of this deviation.

5 Claims, No Drawings

PROCESS FOR THE CONTINUOUS COOLING AND SOLIDIFICATION OF METAL OXIDES BY CONTINUOUS CASTING

BACKGROUND OF THE INVENTION

1. Field of The Invention

The invention relates to a process for the continuous cooling and solidification of metal oxides by continuous casting.

2. Background Of The Invention

A process for the continuous cooling and solidification of metal oxides by continuous casting is known from German Patent No. 1,259,762. In such patent process the metal oxide melt is allowed to run on the peripheral surface of an inwardly cooled roll. The metal oxide melt solidifies there and is fed as a plastic strip through a nip, which is formed between a cooling roller and a press roll. The press roll is placed to be movably perpendicular to the nip and is pressed against the cooling roller by means of a cable line with a weight having a preset pressing force. As a result, the metal oxide strip in the plastic state is separated from the cooling roll and is removed from the peripheral surface of the cooling roll so that it can be conveyed off on a cooled horizontal belt.

Since in such known process the melt is already solidified before running into the nip, no melt accumulation is formed between the rolls, as a result of which also no front sealing elements are necessary. Because of the movability of the press roll perpendicular to the nip, a bearing break is indeed avoided if a very thick material layer solidifies on the cooling roll, but a preset adjustment of the nip is not possible. The product strip achieved with such known process has a greatly fluctuating gage, which has a disadvantageous effect on the uniformity of the abrasive grains obtained from the product strip.

From European Patent Document No. B1 0,057,651 it is known to let metal oxide melts cool and solidify by continuous casting by introducing the melt into the converging space of two inwardly cooled rolls with parallel axes, which rotate in opposite directions as substantially the same peripheral speed. In this case the speed of the rolls and their cooling capacity are regulated so that in the plane of the axis of rotation in the nip between the two outer solidified layers a still liquid film is present. The still liquid film also extends over a small length after the nip. In such known process, a uniform nip is preset so that if a solidified material is pressed through the nip, a bearing or shaft break can occur.

DESCRIPTION OF THE INVENTION

The object of the invention is to provide a process of the type initially mentioned above so that the strip gage of the solidified metal oxide can be kept substantially constant. This object is attained, starting from such known process, by: measuring the gage, which has been preset by the respective product strip width, of the nip, the deviation of the measured gage being determined by a set value; and regulating the speed of the roll speed by means of the deviation so that the deviation is reduced in the nip with the strip gage that decreases relative to the set value and is increased in the nip with the strip gage that increases relative to the set value.

According to experience it is not possible to maintain a uniform filling height in the pouring space between the rolls, i.e., a constant angle of contact between the melt and rolls, since keeping the melt stream constant is very difficult. With the control according to the invention it is now possible, independently of this contact angle, to keep the gage of the formed product strip substantially constant, since achievment of uniform speeds is assured. By increasing the rotation speed the contact time of the melt with the rolls becomes shorter, as a result of which a reduction of the strip gage is achieved; while by a reduction of the rotation speed and the resulting increase of the contact time, the gage of the strip increases. By appropriate fine tuning of this control the gage of the solidified metal oxide strip can be kept reasonably constant, so that abrasive grains obtained therefrom have substantially the same properties.

Solidified metal oxide adhering to the roll surfaces is preferably removed with the help of strippers. If a uniform thin layer of solidified metal oxide continues to adhere to the roll surfaces, that is, a layer which is not removed by the strippers, the control according to the invention still allows the formation of a strip of solidified metal oxide with substantially uniform gage.

Cylindrical rolls, conical rolls and combinations thereof or rolls of other types can be used for rolls provided they allow the desired cooling and solidifying and removal by the nip. The pouring space above the rolls is closed in front by appropriately designed sealing elements.

What is claimed is:

1. Process for the continuous cooling and solidification of metal oxides by continuous casting, in which a product melt is cooled between two rotating rolls, the two rolls forming a nip therebetween, the product is taken from the nip between the rolls and solidified strip, said nip therebetween having a gage defined by the dimension of the nip, the gage being set at a selected value, the rotating rolls forming a cooled, solidified strip, from the product melt, having a gage determined by the dimension of the gage of the nip the rolls rotating at a selected speed, at least one of the rolls is shifted to change the gage of the nip, the rolls are pressed against one another with a certain force perpendicular to the nip, and the nip gage sometimes deviating from the set value during the formation of the cooled, solidified strip, characterized in that the nip gage, which has been preset by the respective product strip width, is measured, the deviation of the measured nip gage being determined by a set value, and by means of this deviation the roll speed is regulated so that it is reduced in the nip with the strip gage that decreases relative to the set value and is increased in the nip with the strip gage that increases relative to the set value.

2. Process as claimed in claim 1 wherein strippers are used to remove any solidified metal oxide adhering the roll surfaces.

3. Process as claimed in claim 1 wherein the rolls are cylindrical rolls, conical rolls or combinations thereof.

4. Process as claimed in claim 1 wherein the pouring space above the rolls is closed in front by sealing elements.

5. Process for the continuous cooling and solidification of metal oxides by continuous casting, in which a product melt is cooled between two rotating rolls, the two rolls forming a nip therebetween, the product is taken from the nip between the rolls as solidified strip, said nip therebetween having a gage defined by the dimension of the nip, the gage being set at a selected value, the rotating rolls forming a cooled, solidified strip, from the product melt, having a gage determined by the dimension of the gage of the nip the rolls rotating at a selected speed, at least one of the rolls is shifted to change the gage of the nip, the rolls are pressed against one another with a certain force perpendicular to the nip, and the nip gage sometimes deviating from the set value during the formation of the cooled, solidified strip, characterized in that the nip gage, which has been preset by the respective product strip width, is measured, the deviation of the measured nip gage being determined by a set value, by means of this deviation the roll speed is regulated so that it is reduced in the nip with the strip gage that decreases relative to the set value and is increased in the nip with the strip gage that increases relative to the set value, and the peripheral speed of the rolls is equal at any particular point in time.

* * * * *